United States Patent
Lee et al.

(10) Patent No.: US 8,347,164 B2
(45) Date of Patent: Jan. 1, 2013

(54) METHOD FOR TRANSMITTING DATA USING HARQ

(75) Inventors: Wook Bong Lee, Anyang-si (KR); Bin Chul Ihm, Anyang-si (KR); Jin Hyuk Jung, Anyang-si (KR); Moon Il Lee, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 338 days.

(21) Appl. No.: 12/452,434

(22) PCT Filed: Jul. 4, 2008

(86) PCT No.: PCT/KR2008/003958
§ 371 (c)(1),
(2), (4) Date: Apr. 21, 2010

(87) PCT Pub. No.: WO2009/008635
PCT Pub. Date: Jan. 15, 2009

(65) Prior Publication Data
US 2010/0199140 A1 Aug. 5, 2010

(30) Foreign Application Priority Data
Jul. 9, 2007 (KR) .................. 10-2007-0068516

(51) Int. Cl.
*H04L 1/18* (2006.01)

(52) U.S. Cl. .............. 714/749; 714/748; 714/774
(58) Field of Classification Search ................ 714/749, 714/748, 751, 746, 774
See application file for complete search history.

(56) References Cited

U.S. PATENT DOCUMENTS

| | | | |
|---|---|---|---|
| 7,185,257 B2 * | 2/2007 | Kim et al. ............ | 714/751 |
| 7,376,879 B2 * | 5/2008 | Terry et al. ........... | 714/751 |
| 2005/0007948 A1 * | 1/2005 | Wan et al. ............ | 370/208 |
| 2007/0066232 A1 * | 3/2007 | Black ................ | 455/67.11 |
| 2009/0141678 A1 * | 6/2009 | Sun et al. ............ | 370/329 |

FOREIGN PATENT DOCUMENTS

| | | |
|---|---|---|
| KR | 10-2004-0048347 A | 6/2004 |
| KR | 10-2006-0037142 A | 5/2006 |
| KR | 10-2006-0074011 A | 6/2006 |
| KR | 10-2006-0134058 A | 12/2006 |
| WO | WO 2005/078976 A1 * | 2/2005 |

* cited by examiner

*Primary Examiner* — Fritz Alphonse
(74) *Attorney, Agent, or Firm* — McKenna Long & Aldridge LLP

(57) ABSTRACT

A method for transmitting data by using hybrid automatic repeat request (HARQ) is provided. A base station allocates a radio resource for a non-acknowledgement (NACK) channel which is used to transmit a NACK signal for multi-user data of a plurality of UEs, transmits the multi-user data, and retransmits the multi-user data when receiving the NACK signal on the NACK channel from at least one UE which receives the multi-user data.

10 Claims, 3 Drawing Sheets

METHOD FOR TRANSMITTING DATA USING HARQ

This application claims priority to International Application No. PCT/KR2008/003958, filed on Jul. 4, 2008 which claims priority to Korean Patent Application No. 10-2007-0068516, filed Jul. 9, 2007, all of which are incorporated by reference for all purposes as if fully set forth herein.

TECHNICAL FIELD

The present invention relates to a method for transmitting data by using hybrid automatic repeat request (HARQ), and more particularly, to a method for transmitting multi-user data.

BACKGROUND ART

Recently, in a radio environment such as a high-speed multimedia wireless communication system, a differentiated quality of service (QoS) has to be ensured as well as high-speed data rate.

An error correction scheme is used to secure communication reliability. Examples of the error correction scheme include a forward error correction (FEC) scheme and an automatic repeat request (ARQ) scheme. In the FEC scheme, errors in received data are corrected by appending an extra error correction code to information bits. In the ARQ scheme, errors are corrected through data retransmission. Examples of the ARQ scheme include stop and wait (SAW), go-back-N (GBN), selective repeat (SR), etc. The FEC scheme has an advantage in that a time delay is not significant and no information is additionally exchanged between a transmitter and a receiver but also has a disadvantage in that system efficiency deteriorates in a good channel environment. The ARQ scheme has a disadvantage in that a time delay occurs and system efficiency deteriorates in a poor channel environment. To solve such disadvantages, a hybrid automatic repeat request (HARQ) scheme is proposed by combining the FEC scheme and the ARQ scheme. In the HARQ scheme, since retransmission is requested when the received data has unrecoverable errors, data transmission performance is improved.

The HARQ scheme can be classified into Type-I, Type-II, and Type-III. In the Type-I scheme, data is discarded when errors are detected, and retransmission of new data is requested. In the Type-II scheme, the error-detected data is not discarded and previous data is combined with retransmitted data. The retransmitted data and the previous data may have different code rates from each other. The Type-III scheme is different from the Type-II scheme in that the retransmitted data is a self-decodable code. That is, the retransmitted data can be decoded without having to be combined with the previous data.

In addition, the HARQ scheme can be classified into chase combining and incremental redundancy (IR). The chase combining is modification of the Type-I scheme. In the chase combining, the error-detected data is not discarded and is combined with the retransmitted data. The IR is the Type-II scheme or the Type-III scheme. This is because additional redundant information is incrementally transmitted when data is retransmitted in the Type-II scheme or the Type-III scheme. For identification purposes, the Type-II scheme may be referred to as full IR, and the Type-III scheme may be referred to as partial IR.

In the HARQ scheme, if no error is detected from received data, a receiver transmits an acknowledgement (ACK) signal as a response signal, and otherwise, if an error is detected from the received data, the receiver transmits a non-acknowledgement (NACK) signal. A transmitter retransmits data upon receiving the NACK signal. If the received data is unicast data which is transmitted to one specific user, error correction can be achieved according to the HARQ scheme. However, if the received data is multi-user data which is transmitted to users of a specific group or all users, there is no known method for transmitting the response signal.

Accordingly, there is a need for a method for transmitting a response signal by using a HARQ scheme when multi-user data is received.

DISCLOSURE OF INVENTION

Technical Problem

The present invention provides a method for transmitting multi-user data by using hybrid automatic repeat request (HARQ).

Technical Solution

According to an aspect of the present invention, a method for transmitting data by using hybrid automatic repeat request (HARQ) includes allocating a radio resource for a non-acknowledgment (NACK) channel which is used to transmit a NACK signal for multi-user data of a plurality of UEs, transmitting the multi-user data, and retransmitting the multi-user data when receiving the NACK signal on the NACK channel from at least one UE which receives the multi-user data.

According to another aspect of the present invention, a method for transmitting data by using HARQ includes receiving multi-user data, and transmitting a NACK signal through a NACK channel when an error is detected on the multi-user data, wherein the NACK channel is allocated to a plurality of UEs.

Advantageous Effects

Only a non-acknowledgement (NACK) signal is transmitted for multi-user data in hybrid automatic repeat request (HARQ) so as to solve a problem in which a base station cannot correctly receive a response signal since different response signals are transmitted through the same resource region. Therefore, the HARQ can be performed effectively.

MODE FOR THE INVENTION

The present invention will now be described more fully with reference to the accompanying drawings, in which exemplary embodiments of the invention are shown. These embodiments are provided so that this disclosure will be thorough and complete, and will fully convey the concept of the invention to those skilled in the art.

Figure 1:
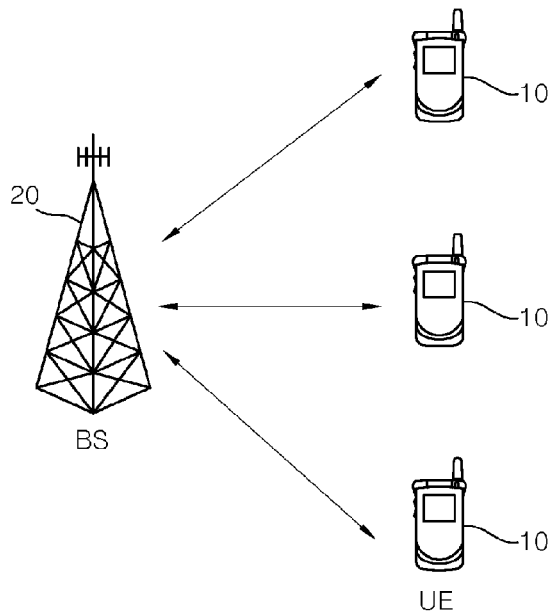
FIG. 1 shows an example of a wireless communication system.

FIG. 1 shows an example of a wireless communication system.

Referring to FIG. 1, the wireless communication system includes a base station (BS) 10 and at least one user equipment (UE) 20. There are one or more cells within the coverage of the BS 10. The wireless communication system can be widely deployed to provide a variety of communication services, such as voices, packet data, etc.

The BS 10 is generally a fixed station that communicates with the UE 20 and may be referred to as another terminology, such as a node-B, a base transceiver system (BTS), an access point, etc. The UE 20 may be fixed or mobile, and may be referred to as another terminology, such as a mobile station (MS), a user terminal (UT), a subscriber station (SS), a wireless device, etc.

The BS 10 and the UE 20 each include a transmitter and a receiver.

A downlink represents a transmission from the BS 10 to the UE 20, and an uplink represents a transmission from the UE 20 to the BS 10. In downlink, the transmitter may be a part of the BS 10, and the receiver may be a part of the UE 20. In uplink, the transmitter may be a part of the UE 20, and the receiver may be a part of the BS 10. The BS 10 may include a plurality of receivers and a plurality of transmitters. The UE 20 may include a plurality of receivers and a plurality of transmitters.

The wireless communication system may be a multiple antenna system. The multiple antenna system may be a multiple-input multiple-output (MIMO) system, a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing I-FT on a received signal. The transmitter uses IFFT to combine the plurality of subcarriers, and the receiver uses FFT to split the plurality of subcarriers.

Figure 2:
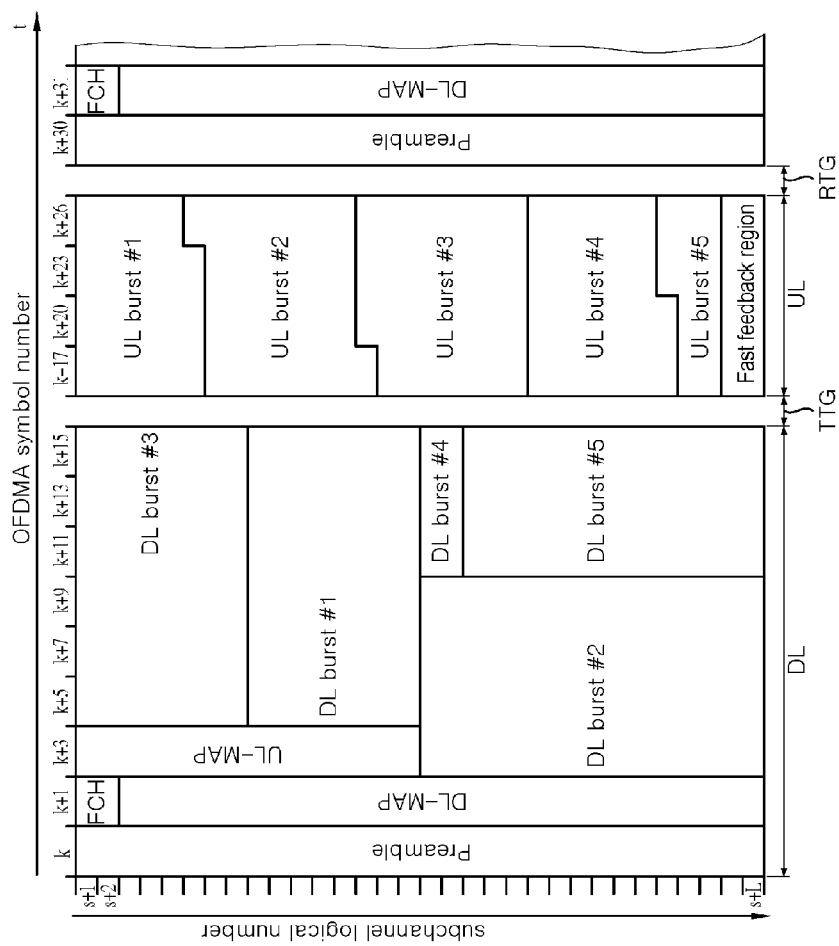
FIG. 2 shows an example of a frame structure.

FIG. 2 shows an example of a frame structure. A frame is a data sequence used according to a physical specification in a fixed time duration. The frame may be an OFDMA frame.

Referring to FIG. 2, the frame includes a downlink (DL) frame and an uplink (UL) frame. When a time division duplex (TDD) scheme is used, UL and DL transmissions share the same frequency but are performed in different time periods. The DL frame is temporally prior to the UL frame. The DL frame includes a preamble, a frame control header (FCH), a DL-MAP, a UL-MAP, and a DL burst region. The UL frame includes a UL burst region.

Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, and estimation of a frequency offset and a channel. An FCH includes information regarding a length of a DL-MAP message and a coding scheme of the DL-MAP. The DL-MAP is a region where the DL-MAP message is transmitted. The DL-MAP message defines a connection of a DL channel. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region where a UL-MAP message is transmitted. The UL-MAP message defines a connection of a UL channel. The UL-MAP message includes a configuration change count of an uplink channel descriptor (UCD) and also includes an effective start time of UL assignment defined by the UL-MAP. The UCD describes a UL burst profile. The UL burst profile indicates characteristics of a UL physical channel and is periodically transmitted by the BS by using a UCD message.

A fast-feedback region is included in a portion of the UL frame. The fast-feedback region is assigned for UL data transmission faster than general UL data transmission. A channel quality indicator (CQI), an acknowledgement (ACK)/non-acknowledgement (NACK) signal, or multi-antenna control information may be carried on the fast-feedback region. The fast-feedback region may be located in any link frames, and the location and size of the fast-feedback region are not limited to those shown in FIG. 2.

A hybrid automatic repeat request (HARQ) MAP message may be located in a burst next to the MAP message. The HARQ MAP message indicates HARQ DL/UL access information. The HARQ MAP message may include DL/UL-MAP information. A plurality of HARQ MAP messages may be carried on a plurality of bursts, and each HARQ MAP message may have a different modulation and code rate. For a UE supporting the HARQ scheme, the HARQ MAP message is used by a BS supporting the HARQ scheme.

A slot is a minimum unit of possible data allocation, and is defined by a time and a subchannel. The subchannel may include a plurality of tiles in UL transmission. The subchannel may include 6 tiles. In UL transmission, one burst may include 3 OFDM symbols and one subchannel. In a partial usage of subchannel (PUSC) permutation, each tile may include 4 consecutive subcarriers on 3 OFDM symbols. The PUSC subcarrier may include 8 data subcarriers and 4 pilot subcarriers. In an optional PUSC permutation, each tile may include 3 consecutive subcarriers on 3 OFDM symbols. The optional PUSC subcarrier may include 8 data subcarriers and one pilot subcarrier. Tiles included in the subchannel are deployed across bandwidth in a distributed manner. A bin includes 9 contiguous subcarriers on an OFDM symbol. A band is a group of 4 rows of the bin. An adaptive modulation and coding (AMC) subchannel includes 6 contiguous bins in the same band.

Figure 3:
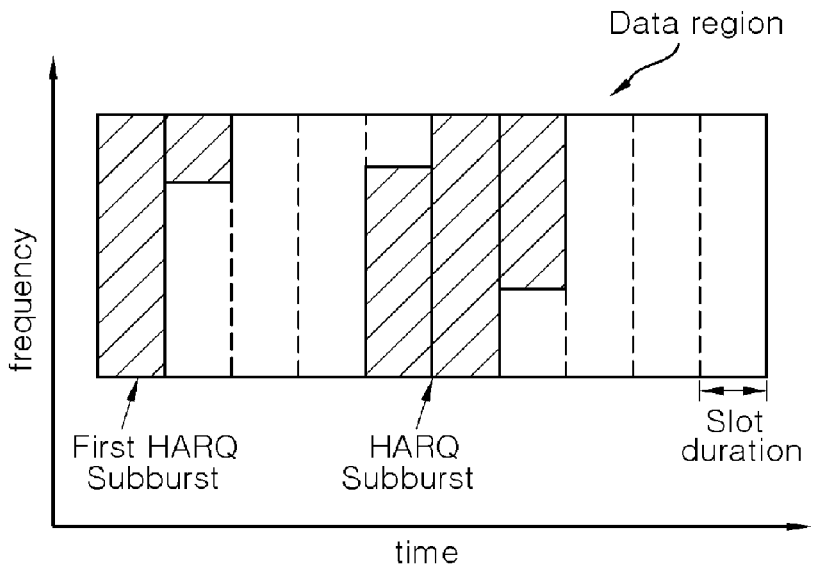
FIG. 3 shows an example of resource allocation for supporting hybrid automatic repeat request (HARQ).

FIG. 3 shows an example of resource allocation for supporting HARQ.

Referring to FIG. 3, in order to support HARQ, HARQ DL MAP information defines a data region including a plurality of symbols and a plurality of subchannels. A plurality of UEs using the same HARQ mode may be assigned to one data region. The HARQ mode is classified into a chase combining mode and an incremental redundancy (IR) mode. The IR mode can use a convolutional turbo code (CTC) or a convolutional code (CC).

One data region can be divided into a plurality of sub-bursts. Each sub-burst may be assigned according to a user or a connection identifier (CID). The CID is an identifier for confirming an equivalent connection between a media access control (MAC) of a UE and a MAC of a BS. Types of CID are various according to a connection status between the UE and the BS.

Table 1 below shows an example of various types of CID.

TABLE 1

| CID | Value | Description |
|---|---|---|
| Ranging CID | 0x0000 | Used by SS and BS during ranging process. |
| Basic | 0x0001 – m | The same value is assigned to both the DL and UL connection. |
| Primary Management | m + 1 – 2m | The same value is assigned to both the DL and UL connection. |
| Transport; Secondary Management | 2m + 1-0xFE9F | For the secondary management connection, the same value is assigned to both the DL and UL connection. |
| Multicast CIDs | 0xFEA0-0xFEFE | For the DL multicast service, the same value is assigned to all MSs on the same channel that participate in this connection. |
| AAS Initial Ranging | 0xFEFF | A BS supporting AAS shall use this CID when allocating an AAS ranging period (using AAS Ranging Allocation IE). |
| Multicast Polling | 0xFF00-0xFFF9 | A BS may be included in one or more multicast polling groups for the purposes of obtaining bandwidth via polling. These connections have no associated service flow. |
| Normal Mode Multicast | 0xFFFA | Used in DL-MAP to denote bursts for transmission of DL broadcast information to normal mode MS. |
| Sleep Mode Multicast | 0xFFFB | Used in DL-MAP to denote bursts for transmission of DL broadcast information to sleep mode MS. May also be used in MOB_TRF-IND messages. |
| Idle Mode Multicast | 0xFFFC | Used in DL-MAP to denote bursts for transmission of DL broadcast information to idle mode MS. May also be used in MOB_PAG-ADV messages. |
| Fragmentable Broadcast | 0xFFFD | Used by the BS for transmission of management broadcast information with fragmentation. The fragment subheader shall use 11-bit FSN on this connection. |
| Padding | 0xFFFE | Used for transmission of padding information by SS and BS. |
| Broadcast | 0xFFFF | Used for broadcast information that is transmitted on a DL to all SS. |

A ranging CID is used by the UE and the BS during a ranging process, for example, in order to attain an accurate timing offset between the UE and the BS, to adjust transmit power, and to periodically track received signal power. For a downlink multicast service, the same multicast CID is assigned to all UEs in the same channel. A broadcast CID is assigned to each UE using broadcast information.

All subbursts of a data region shall only support one of the HARQ modes. The HARQ DL MAP information determines a location and range of the sub-burst. The number of slots is indicated by duration or subchannel number. The slots are allocated in a frequency-first order, starting from the slot with the smallest symbol number and smallest subchannel, and continuing to slots with increasing subchannel number. When the edge of the allocation is reached, the symbol number is increased by a slot duration. Each subburst is separately encoded.

Alternatively, the sub-bursts may be allocated in a time-first order and be determined according to a multiplication result obtained by multiplying the subchannel number and the symbol number. In this case, the sub-burst allocation can be determined according to the subchannel number.

Figure 4:
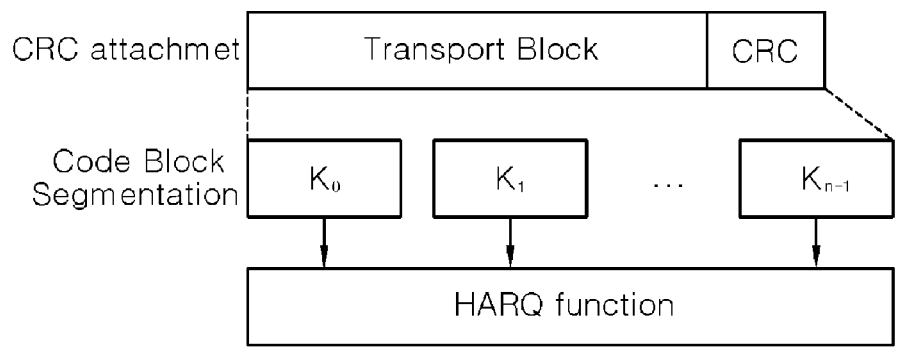
FIG. 4 shows an example of multi-user data processing for HARQ.
Figure 4:
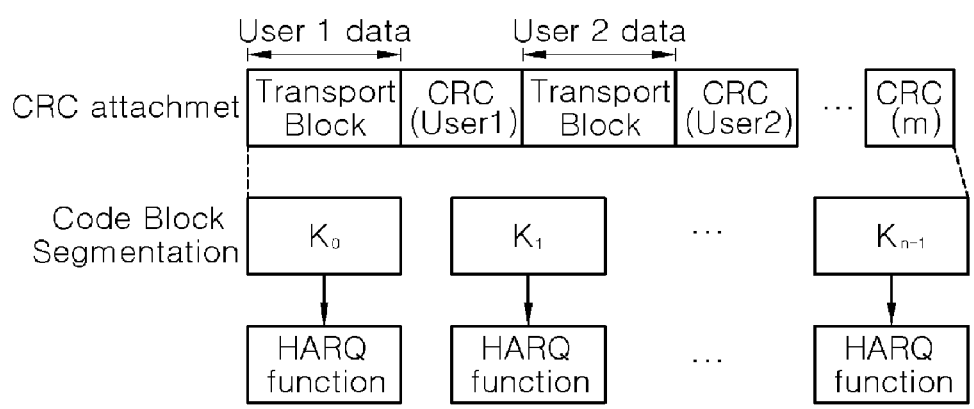

FIG. 4 shows an example of multi-user data processing for HARQ.

Referring to FIG. 4, multi-user data is included in one transport block and is attached with one cyclic redundancy check (CRC). This is referred to as an information block. The information block is encoded into one code. One forward error correction (FEC) may be applied according to an HARQ function. In addition, the information block may be segmented into code blocks having suitable sizes for encoding. The segmented code blocks can be separately encoded and can be applied with the FEC.

In the multi-user data, one CRC can be attached to each user data. For each user data, an information block attached with the CRC can be segmented into a plurality of code blocks. One code block can represent one user data and may be encoded into one code. If user data is large in size, one piece of use data can be segmented into a plurality of code blocks. The FEC can be applied to each code block representing the user data. That is, for each user data, the CRC can be attached and can be applied with the FEC.

Hereinafter, a method for determining HARQ between a BS and a UE and for transmitting a response signal in response to multi-user data will be described.

Figure 5:
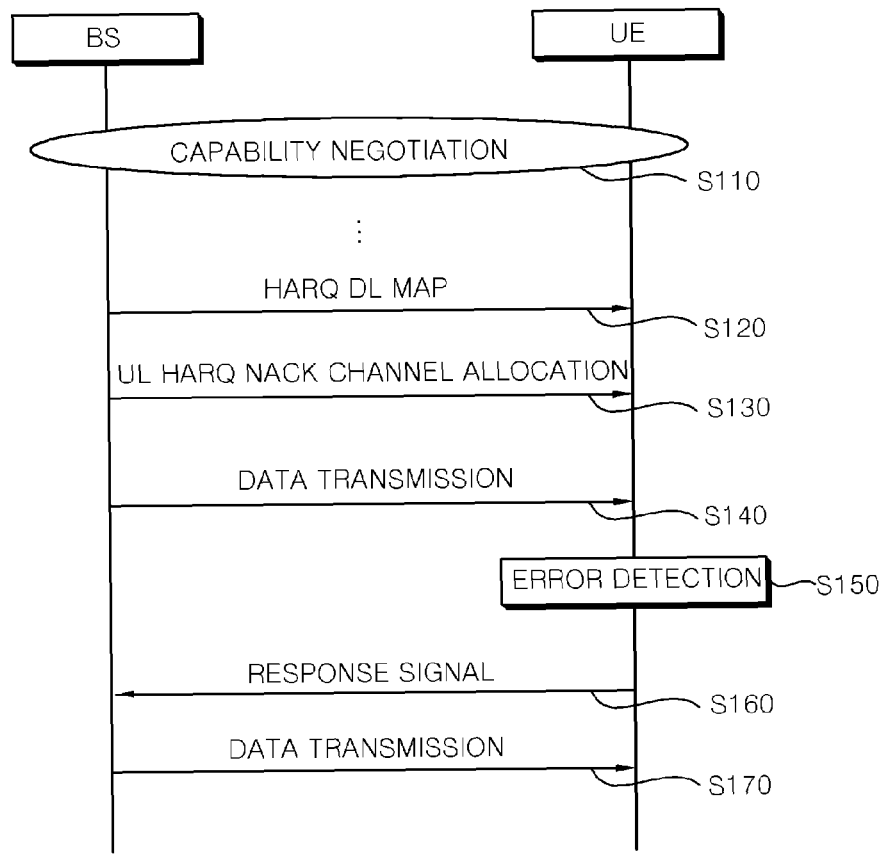
FIG. 5 is a flow diagram showing a method for transmitting data by using HARQ according to an embodiment of the present invention.

FIG. 5 is a flow diagram showing a method for transmitting data by using HARQ according to an embodiment of the present invention.

Referring to FIG. 5, in step S110, capability negotiation is performed between a UE and a BS. The capability negotiation between the UE and the BS is performed in such a manner that the UE transmits a SS-basic capability request (SBC-REQ) to the BS and then the BS transmits a SS-basic capability response (SBC-RSP) in response thereto. The SBC-REQ includes information regarding capability that can be supported by the UE for effective communication between the UE and the BS. The SBC-RSP represents capability to be applied for communication between the UE and the BS. Through the capability negotiation between the UE and the BS, whether to support HARQ is determined and parameters thereof are specified. In the capability negotiation, an UL HARQ mode, an UL HARQ channel number, a DL HARQ mode and a DL HARQ channel number can be determined.

In step S120, if the HARQ is supported in the capability negotiation between the UE and the BS, the BS transmits HARQ DL MAP. Resources required for the HARQ are allocated through the HARQ DL MAP. The HARQ DL MAP includes a type of a reduced CID, an orthogonal frequency division multiple access (OFDMA) symbol offset, a subchannel offset, an OFDMA symbol number, a subchannel number, a HARQ mode, sub-burst information, etc. The reduced CID can be generated by reducing preceding bits of a basic CID into one bit. The reduced CID may be used by the BS in order to reduce a size of an HARQ DL MAP message. The type of the reduced CID may be determined by the BS in consideration of a range of the basic CID of the UE connected to the BS. According to a value of the preceding bit, the reduced CID may be the basic CID, a broadcast CID, or a multicast CID. The sub-burst can be determined according to the OFDMA symbol number and the subchannel number. One burst may be divided into a plurality of sub-bursts when determined. The HARQ mode indicates mode information of an HARQ region. The HARQ mode may be a chase HARQ, an IR HARQ for CRC, an IR HARQ for CC, or the like. When using a multi-antenna system, the HARQ mode may be a MIMO chase HARQ, a MIMO IR HARQ, a MIMO IR HARQ for CC, a MIMO space time coding (STC) HARQ, or the like. Sub-burst information includes specific HARQ information applied to the sub-burst. The sub-burst information includes a sub-burst number, an NACK channel number, an NACK disable state, etc. The NACK disable state can be set for each sub-burst. According to the NACK disable state, it is determined whether the NACK channels will be allocated throughout from a first sub-burst to a last sub-burst. A location and size of the NACK channel can be known through UL HARQ NACK channel allocation information. The NACK channel may be called ACK channel or ACK/NACK channel.

In step s130, the BS transmits the UL HARQ NACK channel allocation information to the UE. The UL HARQ NACK channel allocation information defines one or more NACK channels in a UL resource region. UEs may have the same CID. The same resource region can be allocated to the UEs having the same OD as the NACK channel. The NACK channel region may include one or more subchannels including 6 tiles. One slot of the NACK channel region can be divided into two half-slots. Among the 6 tiles, a first half-slot may include a tile 0, a tile 2, and a tile 4, and a second half-slot may include a tile 1, a tile 3, and a tile 5. NACK signals can be transmitted through the first half-slot or the second half-slot. Accordingly, an HARQ connection is established between the UE and the BS.

In step S140, the BS transmits data to the UE. The data may be multi-user data. The multi-user data may include multicast data and broadcast data. The multicast data includes a multicast CID. UEs belonging to the same group can be assigned with the same multicast CID. The broadcast data includes a broadcast CID. UEs receiving the broadcast data can be assigned with the same broadcast CID. In addition, the multi-user data may be obtained in such a manner that data for all users is arranged in a data region and is multiplexed by applying one or more FECs. For example, data of Voice over Internet Protocol (VoIP) users is arranged in one sub-burst and is multiplexed by applying one or more FECs.

In step S150, the UE decodes the received data and detects an error. In a case where every user data is transmitted through one burst (or sub-burst) by applying FEC and CRC, if the UE knows exactly the location of its own data, the UE may decode its own data block and then may determine whether a CRC error occurs. On the other hand, in a case where multi-user data is transmitted by applying one FEC, the UE detects the CRC error for whole data blocks. In the case where one FEC is applied for the multi-user data, multiplexing is performed in an upper layer (e.g., a MAC layer) of a physical layer. In general, the UE cannot know whether the error occurs in its data even if the CRC error occurs in the multi-user data. However, in a special case such as when a time is provided to recognize a message of the MAC layer, the UE may check whether the error occurs in its own data.

In step S160, the UE transmits a response signal to the BS according to the error detection result. If the FEC is applied for every user data, the UE transmits the response data according to whether the error exists in its own data. If one FEC is applied for the multi-user data, the UE transmits the response signal according to whether the CRC error occurs.

The response signal may be an ACK signal or a NACK signal. The ACK signal is a response signal which informs that data is successfully received since no error is detected from decoded data. The NACK signal is a response signal which requests data retransmission since an error is detected from the decoded data. The data received by the UE may be multi-user data. A plurality of UEs receiving the multi-user data may have the same CID and may be assigned with the same NACK channel. In this case, the NACK signal is only transmitted by a UE which has to transmit the NACK signal. That is, the UE which has to transmit the NACK signal transmits the NACK signal by carrying a specific vector on the NACK channel, and a UE which has to transmit the ACK signal does not transmit any signals. A method for transmitting the response signal by carrying the specific vector on the NACK channel will be described later.

In a case where the received data is unicast data and a plurality of UEs connected to the BS through HARQ have different CIDs from one another, since a response signal is transmitted through different resource regions, the BS can receive and recognize all response signals even if each UE transmits the ACK signal or the NACK signal as the response signal. However, in a case where the data received by the UE is multi-user data and the plurality of UEs have the same CID, since the response signal is transmitted through the same resource region. If the plurality of UEs simultaneously transmit the ACK signal and the NACK signal, the BS cannot receive the signals. Accordingly, when the NACK signal is only transmitted by the UE which has to transmit the NACK signal among the plurality of UEs, the BS can identify the response signal received from the plurality of UEs through the same resource region.

The NACK signal received from the plurality of UEs can be expressed by Math FIG. 1 below.

MathFigure 1

$$Y = H_1 M_n + H_2 M_n + \ldots + H_K M_n + N$$

$$Y = H M_n + N \qquad [\text{Math.1}]$$

Herein, Y denotes an Rx signal, K denotes a number of a UE transmitting a NACK signal, N denotes noise, $M_n$ denotes the NACK signal, and $H = H_1 + H_2 + \ldots + H_K$. When a plurality of UEs transmit NACK signals, the NACK signals is transmitted through the same resource region. Thus, the result is the same as when one UE transmits one NACK signal.

In step S170, the BS retransmits data when receiving the NACK signal from the UE. The retransmitted data may be data generated according to an HARQ mode determined between the UE and the BS. Although original data can be retransmitted without alteration, only erroneous portion may be retransmitted or additional redundant information may be attached to the retransmitted data. If all UEs successfully receive the multi-user data and thus no UE transmits the NACK signal, the BS succeeds in transmission of the multi-user data. In this case, if no NACK signal is received through the NACK channel until a predetermined time elapses after the multi-user data is transmitted, the BS transmits new multi-user data. The predetermined time may be indicated by a frame offset of a frame in which the multi-user data is included. The frame offset may be indicated by a delay time of a response signal in a UCD message.

As such, by transmitting only the NACK signal for the multi-user data, a problem can be solved which occurs when UEs having the same CID transmit different response signals through the same resource region.

Figure 6:
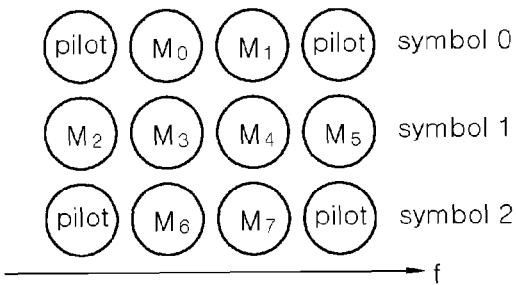
FIG. 6 shows an example of a tile.

FIG. 6 shows an example of a tile. The tile is a PUSC tile.

Referring to FIG. 6, one tile includes 4 subcarriers on 3 OFDM symbols (i.e., symbols 0 to 2), that is, 12 subcarriers in total. The 12 subcarriers can be divided into 8 data subcarriers M0 to M7 and 4 pilot subcarriers.

Figure 7:
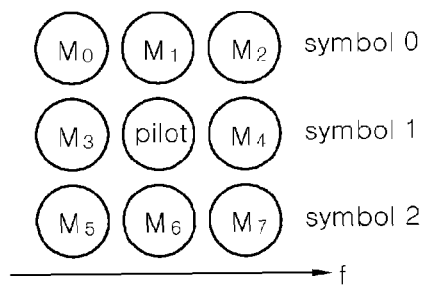
FIG. 7 shows another example of a tile.

FIG. 7 shows another example of a tile. The tile is an optional PUSC tile.

Referring to FIG. 7, one tile includes 3 subcarriers on 3 OFDM symbols (i.e., symbols 0 to 2), that is, 9 subcarriers in total. The 9 subcarriers can be divided into 8 data subcarriers M0 to M7 and one pilot subcarrier.

Hereinafter, a method for transmitting a vector of a response signal on an NACK channel will be described.

The NACK channel for transmitting one response signal may be assigned to a half subchannel. The half subchannel includes 3 tiles. One tile includes 8 data subcarriers. One symbol is carried on one data subcarrier. The 8 symbols carried on one tile constitute one vector.

Table 2 below shows symbols carried on the 8 data subcarriers included in one tile. A total 8 types of vector can be formed, and their indices have values in the range of 0 to 7.

TABLE 2

| Vector Index | $M_{n,8m}, M_{n,8m+1}, \ldots, M_{n,8m+7}$ |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Symbols constituting each vector can be expressed by Math FIG. 2 below.

MathFigure 2

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 2]

Herein, vectors having different indices are orthogonal to one another.

If 1-bit payload represents the ACK signal and the NACK signal, a vector assigned to the ACK signal can be expressed as shown in Table 3 below.

TABLE 3

| ACK 1-bit symbol | Vector Indices per Tile {Tile(0), Tile(2), Tile(4) for even half subchannel/Tile(1), Tile(3), Tile(5) for odd half subchannel} |
|---|---|
| 0 | 0, 0, 0 |
| 1 | 4, 7, 2 |

The NACK channel corresponds to the half subchannel and thus includes 3 tiles. Since one vector is assigned to one tile, 3 vectors are required to represent one ACK signal or NACK signal. The ACK signal may be represented when a bit value of a payload is 0, and the NACK signal may be represented when the bit value of the payload is 1. Alternatively, the NACK signal may be represented when the bit value of the payload is 0, and the ACK signal may be represented when the bit value of the payload is 1. If it is assumed that the NACK signal is represented when the bit value of the payload is 1, the NACK signal can be transmitted by mapping vectors of vector indices 4, 7, and 2 to three tiles of an NACK channel. Symbols corresponding to the vector indices 4, 7, and 2 are mapped to the three tiles of the NACK channel.

Although it has been described under the assumption that symbols representing a vector are carried on data subcarriers included in a tile, the symbols representing the vector may be carried on pilot subcarriers included in the tile. For example, when using the PUSC, 4 pilot subcarriers are included in one tile together with 8 data subcarriers. One vector can be represented with 4 symbols. This vector may be assigned to a tile included in the NACK channel so that the symbols representing the vector can be carried on the pilot subcarriers. That is, the NACK signal can be transmitted by being carried on the pilot subcarriers of the tile.

Meanwhile, between neighbor BSs, the same resource region can be assigned to the NACK channel. In this case, when the NACK signal is transmitted from a first UE connected to a first BS but is transmitted from a second UE connected to a second BS, the NACK signal transmitted from the first UE may be transmitted to the second BS. Thus, the second BS may mistakenly detect the NACK signal transmitted from the first UE.

In order to avoid such interference, different vectors can be used between the neighbor BSs. For example, the different vectors may be configured by using different phase shifted symbols representing the NACK signal between the neighbor BSs. Information regarding symbols of a vector used in a BS can be reported by the BS to UEs connected to the BS. Further, a combination of symbols constituting a vector can be differently defined between the neighbor BSs. Furthermore, a combination of vectors representing the NACK signal can be differently defined. For example, in transmission, UEs connected to a first BS may represent the NACK signal by using a combination of vectors, which are assigned to each tile, with vector indices 4, 7, and 2. In addition, UEs connected to a second BS may represent the NACK signal with vector indices 3, 6, and 1. The vector combination may be achieved in various manners, and a vector applied to the NACK channel used by a plurality of BSs may be modified in various manners. Information regarding a combination of a vector indicating the NACK signal or information regarding a combination of symbols constituting the vector can be informed by the BS to the UEs connected to the BS.

Resource allocation can be achieved such that resource regions for allocating the NACK channel do not overlap between the neighbor BSs. That is, the NACK channel allocation information can be exchanged between the neighbor BSs so that the NACK channel is not allocated to the same subchannel and the same OFDM symbol between the BSs.

Subcarriers on the NACK channel can be scrambled and transmitted for each BS. That is, the NACK signal is generated by assigning a different code to each BS so that the NACK signal is not interfered with another NACK signal transmitted from a UE connected to another BS.

Every function as described above can be performed by a processor such as a micro-processor based on software coded to perform such function, a program code, etc., a controller, a micro-controller, an Application Specific Integrated Circuit (ASIC), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for transmitting data by using hybrid automatic repeat request (HARQ), the method comprising:
    allocating a radio resource for a non-acknowledgment (NACK) channel to a plurality of user equipments (UEs) having the same identifier (ID) in an uplink (UL) resource region, the NACK channel being used to receive a NACK signal for multi-user data of a plurality of UEs, and the NACK channel being allocated to the plurality of UEs based on the same resource region in the UL resource region;
    transmitting the multi-user data comprising the same connection identifier (CID) to the plurality of UEs;
    receiving the NACK signal only from at least one UE among the plurality of UEs on the NACK channel when the at least one UE detects an error from the multi-user data; and
    retransmitting the multi-user data to the plurality of UEs if receiving the NACK signal from the at least one UE.

2. The method of claim 1, wherein the multi-user data is broadcast data or multicast data.

3. The method of claim 1, wherein the multi-user data comprises a plurality of user data, which correspond to each of the plurality of UEs.

4. The method of claim 3, wherein a cyclic redundancy checks (CRCs) is attached to each of the plurality of user data.

5. The method of claim 1, wherein the multi-user data comprises the same broadcast CID.

6. The method of claim 1, wherein the multi-user data comprises the same multicast CID.

7. The method of claim 1, wherein one or more forward error corrections (FECs) is applied for the multi-user data.

8. The method of claim 1, wherein the NACK signal corresponds to a plurality of vector indices, each of the plurality of vector indices indicating a vector including a plurality of modulation symbols, each modulation symbol being assigned to one subcarrier.

9. The method of claim 8,
wherein each modulation symbol is one of P0, P1, P2 and P3 in the equation below:

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right).$$

10. The method of claim 8,
wherein the vectors having different vector indices are orthogonal each other.

* * * * *